United States Patent [19]
Gautier

[11] Patent Number: 4,784,038
[45] Date of Patent: Nov. 15, 1988

[54] PNEUMATIC BRAKE BOOSTER

[75] Inventor: Jean-Pierre Gautier, Aulnay Sous Bois, France

[73] Assignee: Bendix France, Drancy, France

[21] Appl. No.: 92,837

[22] Filed: Sep. 3, 1987

[30] Foreign Application Priority Data

Sep. 10, 1986 [FR] France ............................ 86 12667

[51] Int. Cl.⁴ .............................................. F15B 9/10
[52] U.S. Cl. .................... 91/369.2; 91/376 R
[58] Field of Search ............ 91/369 R, 369 A, 369 B, 91/369 C, 376 R

[56] References Cited

U.S. PATENT DOCUMENTS

| 2,976,846 | 3/1961 | Stelzer | 91/376 R |
| 4,400,942 | 8/1983 | Reinartz et al. | 91/376 R |
| 4,423,665 | 1/1984 | Haar | 91/376 R |
| 4,572,055 | 2/1986 | Schiel | 91/376 R |
| 4,633,760 | 1/1987 | Wagner | 91/376 R |

FOREIGN PATENT DOCUMENTS

| 158552 | 10/1985 | European Pat. Off. ......... 91/376 R |
| 2740754 | 3/1978 | Fed. Rep. of Germany .... 91/369 B |
| 3113271 | 10/1982 | Fed. Rep. of Germany . |
| 3232664 | 3/1984 | Fed. Rep. of Germany . |
| 2456018 | 12/1980 | France . |

Primary Examiner—Robert E. Garrett
Assistant Examiner—Mark A. Williamson
Attorney, Agent, or Firm—Larry J. Palguta; Ken C. Decker

[57] ABSTRACT

The movable wall structure (4, 5) dividing the housing (1) of the booster on the inside possesses a metal plate (4) having a central annular part (6), to which are fixed a stepped tubular insert (9) protecting the reaction disk (25) and a rear tubular element (8), in which is mounted a plastic body part (7) forming communication ducts (16, 23) for the distributor valve mechanism of the booster.

4 Claims, 1 Drawing Sheet

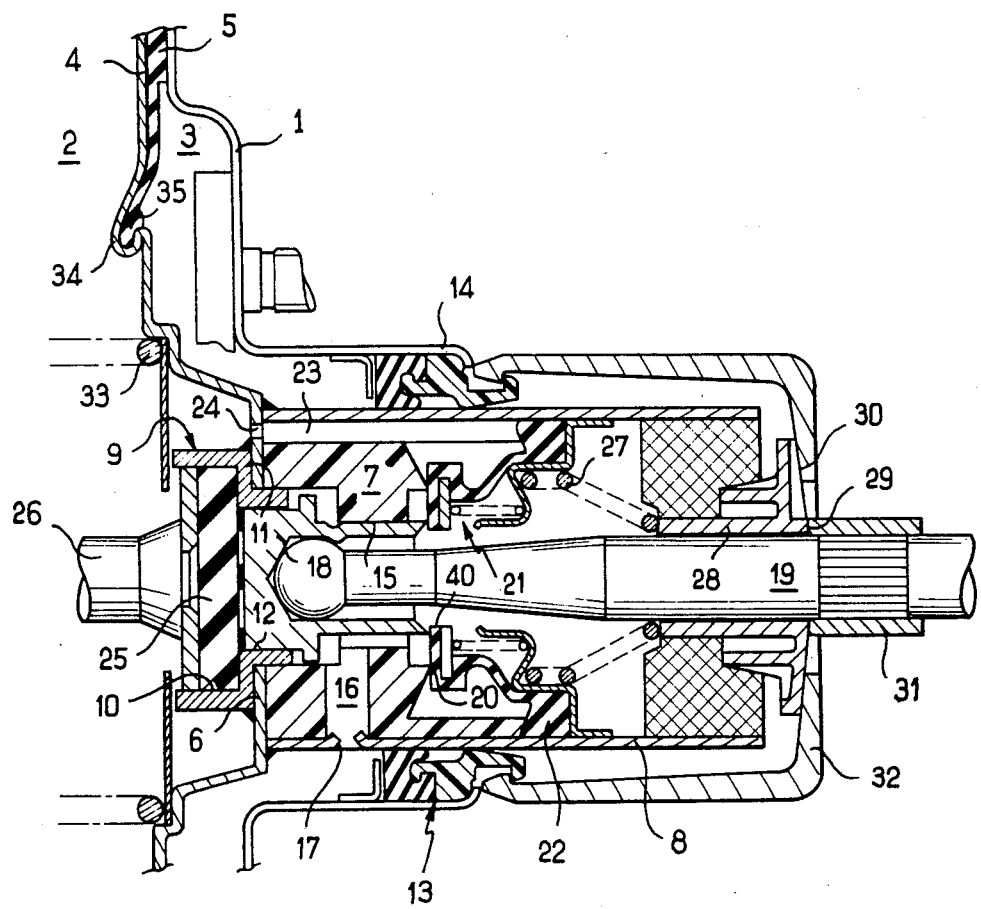

PNEUMATIC BRAKE BOOSTER

The present invention relates to pneumatic brake boosters of the type comprising a housing and a movable wall structure which divides the housing into two chambers and is composed of an assembly comprising a metal plate and a diaphragm and which is fixed centrally to a hub structure accommodating a distributor valve means, possessing a tubular part extending to the outside of the housing and interacting slidably with a guide and sealing assembly carried by the housing, and having at least one plastic body part forming communication ducts between the chambers and the distributor valve means, the latter possessing a shutter element capable of cooperating with two concentric shutter seats formed respectively by the body part of the hub and by a valve plunger coupled to an input member of the booster and having at least one part sliding in a tubular insert which extends in the body part and in which is arranged a reaction disk cooperating with an output member of the booster, the plate of the movable wall structure having a central annular part gripped between a radial shoulder of the insert and an annular end face of the body part of the hub.

A booster of this type is described in the document GB-A-2,145,486.

In conventional pneumatic boosters, the hub structure consists of a solid one-piece plastic component, in which the tubular part extending to the rear outside the housing is prolonged toward the front by a widened portion, on the periphery of which are mounted the plate and the diaphragm of the movable wall structure and in which are arranged the valve plunger and the reaction disk, in an arrangement which is difficult to obtain, particularly because of the communcation ducts and the surface quality required for the rear tubular part, and which has a substantial overall weight.

The document GB-A-2,145,486 relates to a hub arrangement which has essentially the same disadvantages, despite the provision of a tubular insert making it possible to protect the body part of the hub from most of the actuating forces transmitted to the output member, and on the other hand it is difficult and expensive to fix the insert and the body part to each other.

The object of the present invention to provide a pneumatic booster of the type defined in general terms above, which is of a lighter design, is robust and has a low production cost and which, simply by interchanging components of sub-assemblies, makes it possible to obtain various modifications suitable for different vehicles equipped with such brake boosters.

For this purpose, according to one feature of the invention, the tubular insert is fixed directly to the central annular part of the plate, to which is also fixed a tubular element which forms the tubular part of the hub structure and in which the plastic body part of the hub is mounted and fastened with its end face up against the central annular part of the plate of the movable wall structure.

According to a more particular feature of the invention, the insert and the tubular element are metallic and are both welded to the central annular part of the plate, the body part of the hub advantageously being fastened in the tubular element by crimping a zone of the latter into at least one of the communication ducts extending substantially radially from the body part of the hub.

By means of such an arrangement, the body part of the hub is reduced to a tubular core of small size and of low weight which does not present any production problems, and the other components of the hub structure can easily be joined together metal to metal in an automated manner and allowing numerous modifications to be made at various points.

Other features and advantages of the present invention will emerge from the following description of one embodiment, which is given by way of a non-limiting example, with reference to the accompanying drawing in which:

the single FIGURE is a partial longitudinal sectional view of a pneumatic brake booster according to the invention.

The single FIGURE illustrates the rear central part of a pneumatic brake booster of the vacuum type, comprising a housing, of which the central part of the rear shell 1 can be seen, this being divided on the inside into a front chamber, or vacuum chamber 2, and a rear chamber, or a working chamber 3, by a movable wall structure composed of an assembly comprising a metal plate 4 and a flexible diaphragm 5, the periphery of which is retained between the two shells of the housing. According to the invention, the plate 4 has a plane central annular part 6 to which is fixed a hub structure essentially comprising a plastic body part 7, a tubular element 8 and a stepped tubular insert 9. The insert 9 is shaped so as to have a front part forming an inner bore 10 and connected by a radial shoulder 11 to a rear part defining an inner bore 12 of smaller diameter than the bore 10. The tubular element 8 is welded sealingly at its front end to the rear face of the central annular part 6 of the plate 4 and slidably cooperates through its periphery with a guide and sealing assembly 13 mounted in a rear tubular central portion 14 of the rear shell 1 of the housing. The insert 9 is mounted with its rear part extending into the central opening in the central annular part 6 of the plate 4 and is welded sealingly to the front face of this central annular part 6, with the shoulder 11 in contact with the latter. The plastic body part 7 has a stepped central bore 15, with which at least one radial communcation duct 16 opening out to the outside communicates. The body part 7 is mounted in the tubular element 8 with its front face up against the central annular part 6 of the plate 4, typically by the local crimping of the walls of an orifice 17 of the tubular element 8 into the communcation duct 16, the rear part of the insert 9 extending into the front end of the stepped bore 15. Before the body part 7 is mounted on the tubular element 8 in its way, a valve plunger 18 coupled to an input rod 19 of the booster, intended to be connected to a brake pedal (not shown), is mounted slidably in the stepped bore 15 and in the bore 12 of the rear part of the insert 9, after which the latter is fixed to the plate 4. The rear end of the valve plunger 18 forms the first shutter seat 40 concentric relative to a second shutter seat 20 formed by the body part 7, these two shutter seats being intended to cooperate with a shutter element 21 stressed elastically illustrated, the shutter element 21 comprises a peripheral part or assembly bead 22 fitted and retained in the tubular element 8 and blocked up against the rear annular end of the body part 7. The latter has, for example near its periphery, at least one axial passage 23 which, via a corresponding orifice 24 made in the central annular part 6 of the plate 4, makes communcation between the vacuum chamber 2 and the shutter element 21. A reaction disk 25 is arranged in the bore 10 of the front part of the insert 9 and is interposed between the rear end of an output rod 26 of the booster (intended to be coupled to the piston of a master cylinder, not shown) and the shoulder 11 of the insert 9, on the one hand, and the front face of the valve plunger 18 on the other.

In the embodiment illustrated, a spring 27 for returning the input rod 19 bears, on the one hand, on the sheet-metal support for mounting the shutter element 21 in the tubular element 8 and, on the other hand, on the front face of a stop member 28 supported in a freely slidable manner on the 19 and having, at its rear end, stop surfaces 29 and 30 which are separated radially and which are capable of cooperating respectively with a stop ring 31 set in a specific position on the rod 19 and with a stationary stop member 32 advantageously supported at its front end by the guide and sealing assembly 13, in an arrangement which makes it possible to achieve a minimum idle actuating stroke for the booster.

It will be noted that according to the objects of the invention, the body part 7 has a reduced size and volume presenting no production difficulty in order to form, with the tubular element 8 and the insert 9 welded to the plate, a hub which is lighter, but is especially robust and of low production cost and the components of which can easily be interchanged depending on the characteristics required for the booster. In particular, depending on the reaction ratio desired, it is sufficient to modify the insert 9 in order to match a reaction disk of suitable dimensions to it, without having to modify the body part 7 as a result.

According to one aspect of the invention, the plate 4 is shaped, radially on the outside of a step forming a support for the return spring 33 of the piston structure, with an annular groove 34 which makes it possible to fit the central bead 35 of the diaphragm 5.

I claim:

1. A pneumatic brake booster, comprising a housing and a movable wall structure which divides the housing into two chambers, the wall structure comprising a metal plate and a diaphragm and which is fixed centrally to a hub structure accommodating distributor valve means, the hub structure having a tubular element extending to the outside of the housing and cooperating slidably with a guide and sealing assembly carried by the housing, and having at least one plastic body part forming communication ducts between the chambers and the distributor valve means, the distributor valve means including a shutter element capable of cooperating with two concentric shutter seats formed respectively by the body part and by a valve plunger coupled to an input member of the booster and having at least one part sliding in a tubular insert which extends into the body part and in which is arranged a reaction disk cooperating with an output member of the booster, the plate having a central annular part gripped between a radial shoulder of the insert and an annular end face of the body part, characterized in that the tubular insert is fixed to the central annular part of the plate, to which is also fixed the tubular element which forms a tubular part of the hub structure and in which the body part is mounted and fastened with an end face against the central annular part of the plate, the shutter element comprising a peripheral assembly part mounted in the tubular element against an annular end of the body part, the plate having, radially spaced apart from the central annular part, a groove for attachment of a central assembly bead of the diaphragm, the insert being metallic and welded to the central annular part of the plate, the tubular element being metalic and welded to the central annular part of the plate, and the body part fastened in the tubular element by crimping a zone of the tubular element into at least one substantially radial communication duct formed in the body part.

2. The booster according to claim 1, characterized in that the booster has a spring for returning the input member, the spring bearing on a bearing element supported in a freely slidably manner on the input member and capable of cooperating with a stationary stop and with a stop carried by the input member.

3. The booster according to claim 2, characterized in that the stationary stop is a stop member fixed to the housing.

4. The booster according to claim 3, characterized in that the stationary stop is supported at one end by the guide and sealing assembly.

* * * * *